(12) United States Patent
Hald et al.

(10) Patent No.: US 12,311,324 B2
(45) Date of Patent: May 27, 2025

(54) PUMP DEVICE WITH A CENTRIFUGAL PUMP AND A MIXING UNIT

(71) Applicant: GRUNDFOS HOLDING A/S, Bjerringbro (DK)

(72) Inventors: Jens Hald, Bjerringbro (DK); Klaus Frederiksen, Bjerringbro (DK); Bent Ole Emdal Domino, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 0 days.

(21) Appl. No.: 18/841,201

(22) PCT Filed: Feb. 7, 2023

(86) PCT No.: PCT/EP2023/052980
§ 371 (c)(1),
(2) Date: Aug. 23, 2024

(87) PCT Pub. No.: WO2023/161017
PCT Pub. Date: Aug. 31, 2023

(65) Prior Publication Data
US 2025/0108345 A1 Apr. 3, 2025

(30) Foreign Application Priority Data
Feb. 25, 2022 (DK) .............................. PA202270067

(51) Int. Cl.
*F04D 15/00* (2006.01)
*B01F 25/64* (2022.01)
(Continued)

(52) U.S. Cl.
CPC ............ *B01F 25/64* (2022.01); *B01F 35/213* (2022.01); *B01F 35/2211* (2022.01);
(Continued)

(58) Field of Classification Search
CPC .... F04D 15/0005; F04D 7/045; B01F 35/138; B01F 25/64
See application file for complete search history.

(56) References Cited

U.S. PATENT DOCUMENTS 10,677,249 B2 * 6/2020 Blad ................... F04D 15/0005
2016/0258340 A1 9/2016 Klippert et al.
(Continued)

FOREIGN PATENT DOCUMENTS

EP 3037669 A1 6/2016

OTHER PUBLICATIONS

Danish Patent and Trademark Office, 1st technical examination report issued in corresponding Danish Appl. No. PA202270067 dated Sep. 21, 2022, 7 pages.
(Continued)

*Primary Examiner* — Elizabeth Insler
(74) *Attorney, Agent, or Firm* — J. Peter Paredes; Amin Wasserman Gurnani LLP (57) ABSTRACT

A pump device (1) comprises a centrifugal pump (2) and a mixing unit (4) in which two fluids are mixed. The mixing unit (4) comprises a flapper valve (10) configured to move between a first and a second position in which it closes a first inlet (7) and a second inlet (8) of the mixing unit, respectively. At least one of the inlets houses a movable piston (13) which is biased towards being in contact with the flapper valve. The piston has at least one piston channel (15) or annular space (23) through which the fluid flows in to the mixing unit in a controlled manner.

20 Claims, 9 Drawing Sheets

(51) Int. Cl.
  *B01F 35/213*  (2022.01)
  *B01F 35/221*  (2022.01)
  *B01F 35/71*  (2022.01)
  *B01F 35/82*  (2022.01)
  *B01F 35/83*  (2022.01)
  *F04D 7/04*  (2006.01)
  *F04D 29/42*  (2006.01)
  *F16K 15/03*  (2006.01)
  *F24D 3/10*  (2006.01)
  *G05D 11/13*  (2006.01)

(52) U.S. Cl.
  CPC .. *B01F 35/7174* (2022.01); *B01F 35/718051* (2022.01); *B01F 35/82* (2022.01); *B01F 35/833* (2022.01); *F04D 7/045* (2013.01); *G05D 11/13* (2013.01); *B01F 2215/0422* (2013.01)

(56) References Cited

U.S. PATENT DOCUMENTS

| | | |
|---|---|---|
| 2018/0156220 A1 | 6/2018 | Cooper |
| 2020/0072227 A1 | 3/2020 | Blad et al. |
| 2021/0164664 A1 | 6/2021 | Blad et al. |

OTHER PUBLICATIONS

WIPO/ISA/EPO, International Search Report and Written Opinion issued in corresponding International Application No. PCT/EP2023/052980 on May 11, 2023, 9 pages.

\* cited by examiner

PUMP DEVICE WITH A CENTRIFUGAL PUMP AND A MIXING UNIT

CROSS-REFERENCE TO RELATED APPLICATIONS

The present application claims priority to PCT application serial no. PCT/EP2023/052980, filed Feb. 7, 2023, which claims priority to Danish patent application serial no. PA202270067, filed Feb. 25, 2022, each herein incorporated by reference in their entireties.

FIELD OF THE INVENTION

The present invention relates to a pump device comprising a centrifugal pump and a mixing unit for mixing fluid from a first fluid source and a second fluid source. In particular, the present invention relates to a pump device comprising at least one piston and a flapper valve which is configured to maintain intermediate positions between two inlets and thereby allow for control of the mixing ratio between fluids from the two fluid inlets.

BACKGROUND OF THE INVENTION

Centrifugal pumps are used in a wide variety of applications, including in heating and cooling systems. For some of these applications, the pump is used in combination with a diverter arranged in series with the pump and used to switch between inlets from two different fluid sources from which fluids are to be pumped. The diverter typically comprises a flapper valve which can move between two different positions in which it closes off the connection to one of the fluid sources at a time while leaving the other fully open.

For some applications, it is necessary to mix fluids from two different fluid sources to obtain a desired mixing ratio resulting in a given value of a parameter of the mixed fluid. This is e.g. the case when cold water and hot water are mixed in order to obtain a desired temperature of water to be used e.g. for heating or for showering. Another example is a combined system for room heating and floor heating where the temperature of the water flowing in the radiators typically is higher than the temperature of the water for the floor heating so that different mixing ratios of water from two water supplies are needed. In systems where mixing is used, this is typically done by arranging a separate mixing unit in series with the pump.

For all of the types of systems mentioned, it is necessary to arrange an additional unit in series with the pump. This requires sufficient space, and it also means that the additional unit as well as the connecting elements are typically assembled with the centrifugal pump at the location of installation.

Hence, an improved pump device would be advantageous.

OBJECT OF THE INVENTION

It is an object of the present invention to provide a pump device with which it is possible to mix fluid from a first fluid source and a second fluid source before it flows into a centrifugal pump.

It is another object of the present invention to provide a pump device for mixing two fluids to be pumped by a centrifugal pump with which pump device the mixing takes place in a mixing unit mounted to or integrated with the centrifugal pump.

It is an object of at least some embodiments of the present invention to provide a pump device with which it is possible to obtain a more precise control of the mixing ratio between two fluids being pumped by the pump device than what is possible with corresponding prior art pump devices.

It is another object of at least some embodiments of the present invention to provide a pump device which is more compact than corresponding prior art solutions assembled from two or more units which are to be assembled or arranged in series. By such a compact design, a number of advantages are obtained including a lower material usage, no need for interconnecting pieces, lower cost, and less space needed for the installation.

It is another object of at least some embodiments of the present invention to provide a pump device which is easier to install at a site of use, since the pump device can be provided as a preassembled or integrated unit ready for installation as one unit.

It is a further object of the present invention to provide an alternative to the prior art.

In particular, it may be seen as an object of the present invention to provide a pump device that solves the above-mentioned problems of the prior art.

SUMMARY OF THE INVENTION

The above-described object and several other objects are intended to be obtained in a first aspect of the invention by providing a pump device comprising:
- a centrifugal pump having a pump inlet for receiving a fluid to be pumped, and
- a mixing unit mounted to or integrated with the centrifugal pump, wherein the mixing unit comprises:
- a first inlet configured to be connected to a first fluid supply,
- a second inlet configured to be connected to a second fluid supply,
- an outlet in fluid communication with the pump inlet, and
- a flapper valve configured to perform a pivoting movement between:
  - a first position in which it is engaged with a first valve seat of the first inlet so that the flapper valve closes the first inlet while providing fluid communication between the second inlet and the outlet, and
  - a second position in which it is engaged with a second valve seat of the second inlet so that the flapper valve closes the second inlet while providing fluid communication between the first inlet and the outlet, wherein at least one of the first inlet and the second inlet houses a piston being:
- configured to move along an inner surface of the respective inlet,
- biased towards being in contact with the flapper valve during use,
- provided with at least one piston channel or annular space extending between:
  - an end of the piston facing towards the respective fluid supply, and
  - a region of a circumferential surface of the piston, which region:
    - is covered by the inner surface of the respective inlet, when the flapper valve is engaged with the valve seat of the respective inlet,
    - extends beyond the inner surface of the respective inlet, when the flapper valve is out of engagement with the valve seat of the respective inlet, and shaped and dimensioned to provide a flow passage having a smaller flow-through area via the piston channel or the annual space than a cross-sectional area of the respective inlet, and wherein the position of the flapper valve is controllable, and the flapper valve is configured to maintain intermediate positions between the first position and the second position thereby providing corresponding mixing ratios of fluids flowing into the centrifugal pump via the first inlet and the second inlet during use of the pump device.

By stating that "the flapper valve is configured to maintain intermediate positions" is meant that the flapper valve remains in an intermediate position until it is actively moved to another positions, such as another intermediate position, the first position, or the second position.

What is referred to as "annual space" could also be considered as being a piston channel having an annular shape. However, to more clearly distinguish between the two different types of embodiments, as will be clearer from the figures, both terms have been used.

In some embodiments of the invention, each piston comprises the annular space and further comprises:
 a piston rod surrounded by the annular space,
 a disc-shaped piston top comprising the circumferential surface of the piston, wherein the piston top is:
  arranged on the piston rod,
  facing towards the flapper valve, and
  extending in a plane which is inclined with respect to a longitudinal axis of the respective first or second inlet housing the piston, and
 at least one guide element extending from the piston top and configured to guide the movement of the piston along the inner surface of the respective inlet during use.

The term "disc-shaped" used about the piston top means that it has an extension in the inclined plane as described. The surfaces of the piston top facing towards and away from the flapper valve, respectively, may be plane, such as parallel, or one or both of them may be non-plane, such as having a curved shape. The shape will be determined as part of the design process for a given application of the pump device in order to ensure a satisfactory functioning both with respect to load distribution and points of contact. This influences e.g. the precision of the movement, the fluid-tightness, and the risk of wear. The design will typically be determined by use of computer simulations and/or physical tests on prototypes.

A piston is typically spring-loaded so that it is thereby biased towards being in contact with the flapper valve. Hereby it is obtained that only the flapper valve needs to be actively moved to a desired position, and then the piston automatically performs a corresponding movement by influence of the spring.

By a design of the piston and the arrangement thereof with respect to an inlet as described above, it is obtained that the fluid flows through the piston channel or annular space and leaves it via the region at the circumferential surface.

Therefore, for some positions of the flapper valve and thereby of the piston, a part of the piston channel or the annular space will be closed. Hereby the flow-through area of the piston channel or the annular space is varied by varying the position of the flapper valve in relation to the inlet in which the piston is arranged. Thus, by use of the pump device according to the invention, the flow of fluids from the first and second fluid sources and the resulting mixing ratio thereof are controlled by the position of the at least one piston itself and the resulting fluid flow through the at least one corresponding piston channel or annular space.

With the present invention, it is possible to obtain a more precise control of the amount of fluid flowing into the mixing unit via each of the first and second inlets. This will be explained in further details in relation to the figures.

In some embodiments of the invention, the mixing unit comprises a piston in each of the first inlet and the second inlet. Alternatively, there is a piston in only one of the inlets. By having a piston in each of the first and second inlets, it may be easier to ensure a precise control of the mixing ratio of the fluids from the first and second fluid supplies. An example of an embodiment in which one piston may be sufficient is for applications where one of the fluids is supplied in a significantly smaller amount than the other, and only this smaller amount needs to be precisely controlled.

Each piston—of which there is one or two—may be arranged in an insert mounted in the respective inlet, and the insert may comprise the valve seat of the respective inlet. An insert may guide the movement of the piston arranged therein. In embodiments wherein a piston is spring-loaded, the insert may also be used hold the spring in the correct position. Another advantage of such at least one insert is that it will be possible to manufacture the insert from another material than that of the housing of the mixing unit, such as a material having desired frictional characteristics in relation to the material of the piston to move therein. Another advantage is that it may be easier to obtain specific geometries and dimensional tolerances of the inlets than what would be possible without such inserts. Furthermore, it may be possible to obtain different configurations of the inlets of a mixing unit with a fixed design of a housing of the mixing unit by selecting among a range of inlets and corresponding pistons to be installed in a given housing.

In some embodiments of the invention, the at least one insert is tiltable around a longitudinal axis, such as the insert being tiltable by ±3 degrees, such as tiltable by ±2 degrees, such as tiltable by ±1.5 degrees, such as being tiltable by ±1 degree. This is particularly advantageous for embodiments where the inserts comprise the valve seats. By such tilting, it is easier to ensure a tight engagement with the surfaces of the flapper valve which typically performs a pivoting movement. The flapper valve may e.g. pivot by an angle of ±10 degrees, such as ±8 degrees, such as ±6 degrees, when moving between the first and the second positions. The exact angular orientation of the flapper valve provides the actual intermediate position in which it is maintained, and by using tiltable inserts typically provided with O-rings, they can tilt to a matching angular orientation so that an even contact pressure between the flapper valve and the respective valve seat can be ensured. This provides as evenly distributed closing forces as possible and thereby also as tight an engagement as possible. Furthermore, such a design may lower the local contact pressure between the flapper valve and the valve seats. Thereby it also lowers the risk of wear or other possible damage that could arise due to an uneven distribution of the forces over the valve seat.

The position of the flapper valve may be controllable by use of an electric motor, such as a stepper motor. An example of the arrangement of such an electric motor and how it is used to pivot the flapper valve will be shown in the figures.

In presently preferred embodiments of the invention, the position of the flapper valve is controllable, during use, in dependence of:
 a desired final temperature of fluid leaving the mixing unit via the outlet.

This control may e.g. be obtained by the control system defining a certain position for the flapper valve by use of an intelligent algorithm incorporated, e.g., in a P, PI, PD, or PID controller. Alternatively, other controllers such as MPC (model predictive control), feedforward, or fuzzy logic may be equally suitable.

In some embodiments of the invention, the position of the flapper valve is further controllable, during use, in dependence of:
- a known first temperature of fluid entering the mixing unit via the first inlet, and/or
- a known second temperature of fluid entering the mixing unit via the second inlet.

With such embodiments, it may be faster to obtain a desired final temperature in systems wherein the temperatures of the in-flowing fluids vary, since the additional information results in less iterations by the control system being needed before a steady state is reached.

Such two last mentioned embodiments can e.g. be used in a heating system supplying hot water to radiators for room heating and at the same time to a floor-heating. The radiators will normally need a higher temperature of the water than what is suitable for floor heating. The first fluid heating source can then be used to supply hot water directly to the room heating where the pump device can be used to mix the hot water with an appropriate amount of colder water from a second fluid source, which is typically the return of the underfloor-heating, to match the need in the floor-heating part of the system. However, the invention can be used for any system in which it is desired to mix fluids from two different fluid supplies in a controlled manner.

The position of the flapper valve may be varied while the pump device is in use and fluid is flowing through the mixing valve. Hereby it will be possible to vary the mixing ratio of the fluids from the first and second fluid sources, and thereby a selected parameter of the fluid being pumped, without having to interrupt the pumping. It can also be used to adjust for changes in a given parameter of the fluid at the fluid sources.

The flapper valve may be made from a rubber material or other types of material which have an elasticity allowing for the establishment of a fluid-tight engagement with the first and second valve seats.

In some embodiments of the invention, the at least one piston and/or the at least one insert, when present, has/have been manufactured by 3D-printing. By use of 3D-printing, it may be easier to obtain at least some specific geometries than what would be possible with other methods, such as injection moulding. It may also be advantageous to use 3D-printing for components to be made in small numbers. The wording "at least one" is used here, since as described above there may be a piston in one or both of the first and second inlets. These one or two pistons may be arranged in an insert as described above.

In a second aspect, the present invention relates to a method of mixing fluid from a first fluid source and a second fluid source by use of a pump device according to any of the preceding claims, the method comprising the following steps:
- determining a desired value of a parameter of the fluid flowing from the outlet of the mixing unit and into the pump inlet,
- determining an intermediate position of the flapper valve which will provide the desired value of the parameter of the mixed fluid,
- positioning the flapper valve in the determined intermediate position, and
- pumping the fluid via the mixing unit and into the pump inlet.

Such a method may further comprise the following steps:
- based on known values of the parameter of fluid flowing from the first fluid source and from the second fluid source, determining a mixing ratio of fluid from the first and second fluid sources which mixing ratio will result in the desired value of the parameter of the mixed fluid,
- determining the intermediate position of the flapper valve which will provide the determined mixing ratio.

The parameter may be the temperature e.g. as described in the example given above relating to a system for providing both room heating and floor heating.

The first and second aspects of the present invention may each be combined. These and other aspects of the invention will be apparent from and elucidated with reference to the embodiments described hereinafter.

BRIEF DESCRIPTION OF THE FIGURES

The pump device according to the invention as well as the use thereof for mixing fluid will now be described in more detail with regard to the accompanying figures.

The figures show one way of implementing the present invention and is not to be construed as being limiting to other possible embodiments falling within the scope of the attached claim set.

FIGS. 1.*a* to 1.*c* schematically show the overall design of a pump device with the flapper valve in the first position, the second position, and an intermediate position, respectively.

FIGS. 2.*a* to 2.*d* schematically show partially sectional views of two embodiments of a pump device having pistons arranged in the first and second inlets.

FIGS. 3.*a* and 3.*b* schematically show partially sectional views of an embodiment having inserts arranged in the first and second inlets, and each inlet having a piston arranged therein.

FIGS. 4.*a* and 4.*b* schematically show partially sectional views of embodiments with only one piston.

FIGS. 5.*a* and 5.*b* show how the use of a piston in an insert changes the flow curve. FIG. 5.*a* shows an exemplary flow curve for an inlet without a piston, and FIG. 5.*b* shows an exemplary flow curve for a similar inlet with a piston.

FIGS. 7.*a* and 7.*b* schematically show an embodiment of the invention comprising pistons each having and inclined piston top and an annular space for the flow of fluid.

FIGS. 8.*a* to 8.*d* schematically show the functioning of the pump device in FIGS. 7.*a* and 7.*b*.

DETAILED DESCRIPTION OF AN EMBODIMENT

Figure 1:
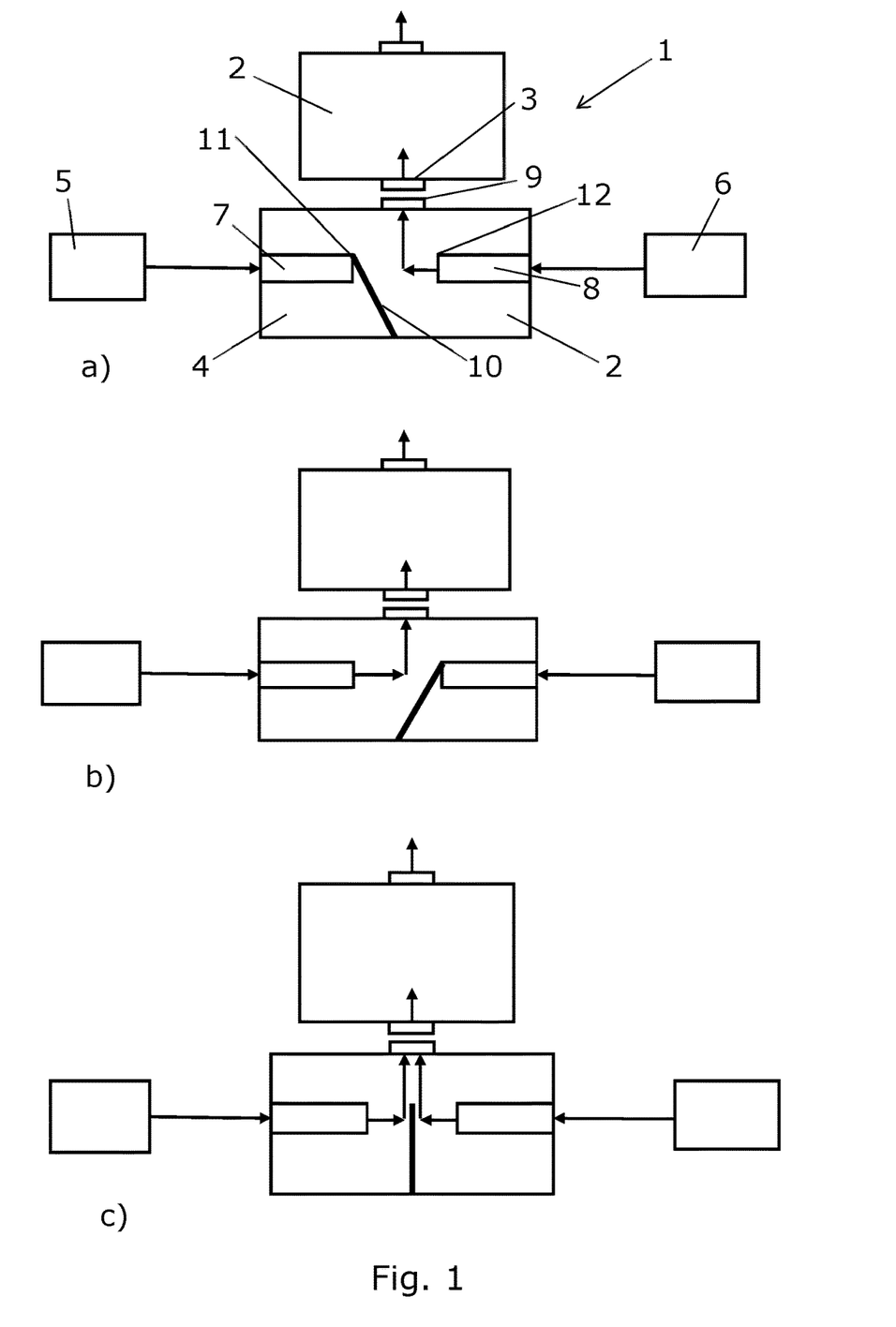

FIGS. 1.*a* to 1.*c* schematically show the overall design of a pump device 1 according to the present invention. The pump device 1 comprises a centrifugal pump 2 having a pump inlet 3 for receiving a fluid to be pumped and a mixing unit 4. The centrifugal pump 2 also has other elements as will be well known for a person skilled in the art. However, they will not be mentioned in the following description as they are not of direct relevance for the invention which is mainly related to the mixing unit 4.

In FIGS. 1.*a* to 1.*c*, the centrifugal pump 2 and the mixing unit 4 are shown slightly separated for illustrative purposes, but in practise, the mixing unit 4 is mounted to or integrated with the centrifugal pump 2. The figures show the pump device 1 in a configuration ready for use, i.e. connected to a first fluid supply 5 and a second fluid supply 6. The mixing unit 4 is used for mixing the fluid from the two fluid supplies 5,6 before the mixed fluid flows into the centrifugal pump 2. The FIGS. 1.a to 1.c show the mixing unit 4 with a first inlet 7 connected to the first fluid supply 5 and a second inlet 8 connected to the second fluid supply 6. An outlet 9 of the mixing unit 4 is in fluid communication with the pump inlet 3. The mixing unit 4 further comprises a flapper valve 10 configured to perform a pivoting movement between a first position as shown in FIG. 1.a and a second position as shown in FIG. 1.b. In the first position, the flapper valve 10 is engaged with a first valve seat 11 of the first inlet 7 so that the flapper valve 10 closes the first inlet 7 while providing fluid communication between the second inlet 8 and the outlet 9. In the second position, the flapper valve 10 is engaged with a second valve seat 12 of the second inlet 8 so that the flapper valve 10 closes the second inlet 8 while providing fluid communication between the first inlet 7 and the outlet 9. These two positions correspond to what is known from a prior art pump device 1. However, an essential feature of the present invention is that the position of the flapper valve 10 is controllable so that the flapper valve 10 is configured to maintain intermediate positions between the first position and the second position as shown schematically in FIG. 1.c. Thereby the flapper valve—in combination with the at least one piston—provides corresponding mixing ratios of fluids flowing into the centrifugal pump 2 via the first inlet 7 and the second inlet 8 during use of the pump device 1.

Figure 2:
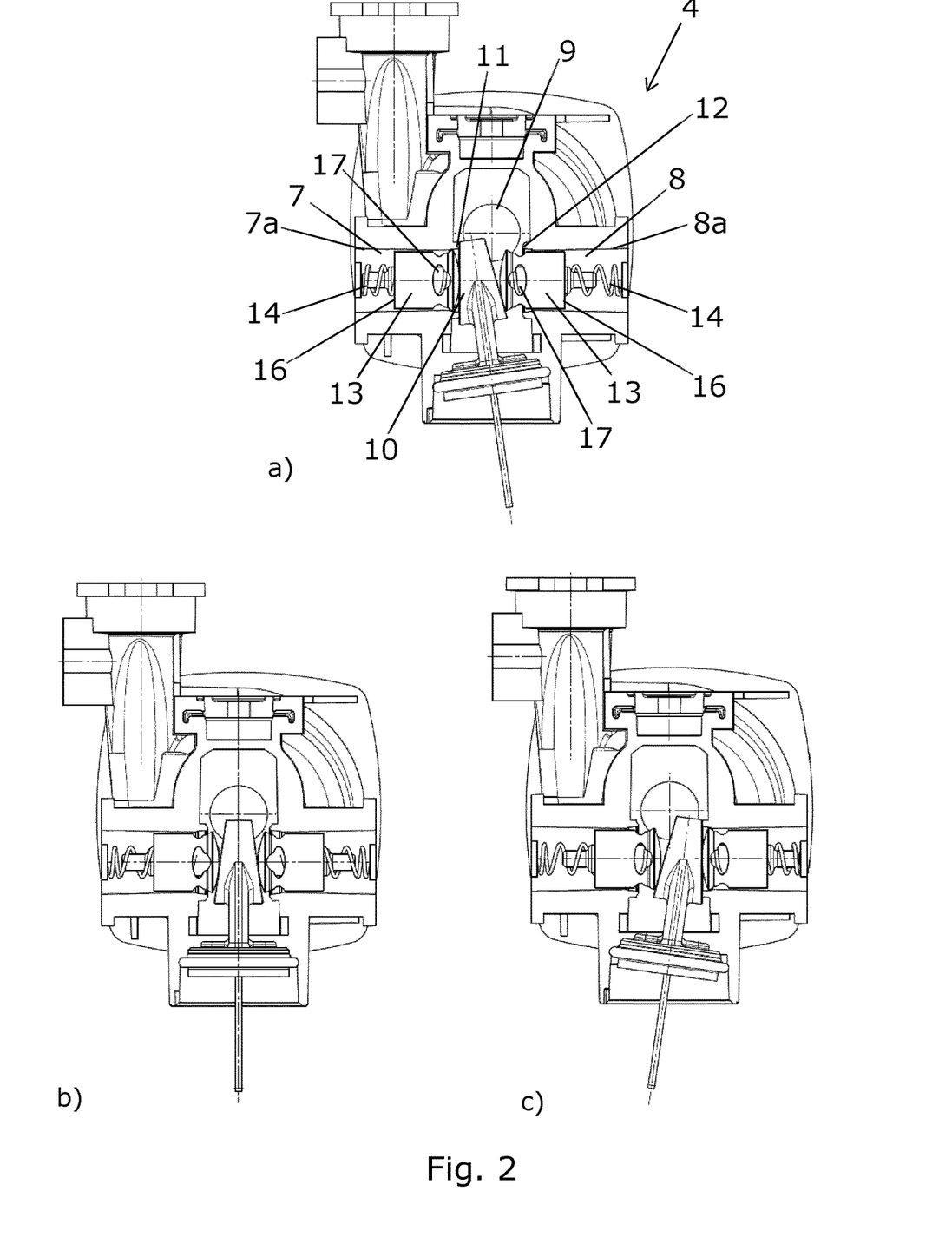

FIGS. 2.a to 2.d schematically show partially sectional views of two embodiments of the invention in which each of the first and the second inlets 7,8 houses a piston 13. The embodiment in FIG. 1 also has a piston in at least one of the inlets 7,8, but it has been left out from that schematic figure. Each piston 13 is configured to move along an inner surface 7a, 7b of the respective inlet 7,8 while being biased towards being in contact with the flapper valve 10. This may e.g. be ensured by the pistons 13 being provided with springs 14. FIGS. 2.a, 2.b, and 2.c show the flapper valve 10 in the first, an intermediate, and the second positions, respectively. The flapper valve 10 is typically controllable to maintain any desired intermediate position. Even though FIGS. 2.a to 2.c show both pistons 13 as being spring-loaded, the scope of protection also covers embodiments without springs 14. Such an embodiment is shown schematically in FIG. 2.d with the flapper valve 10 in the same position as in FIG. 2.b. In such embodiments, the pistons 13 will be forced towards engagement with the flapper valve 10 by the differential pressure across the pistons 13 due to the flow of fluid. It would also be possible to have only one of the two pistons 13 provided with a spring 14, if desired.

Figure 3:
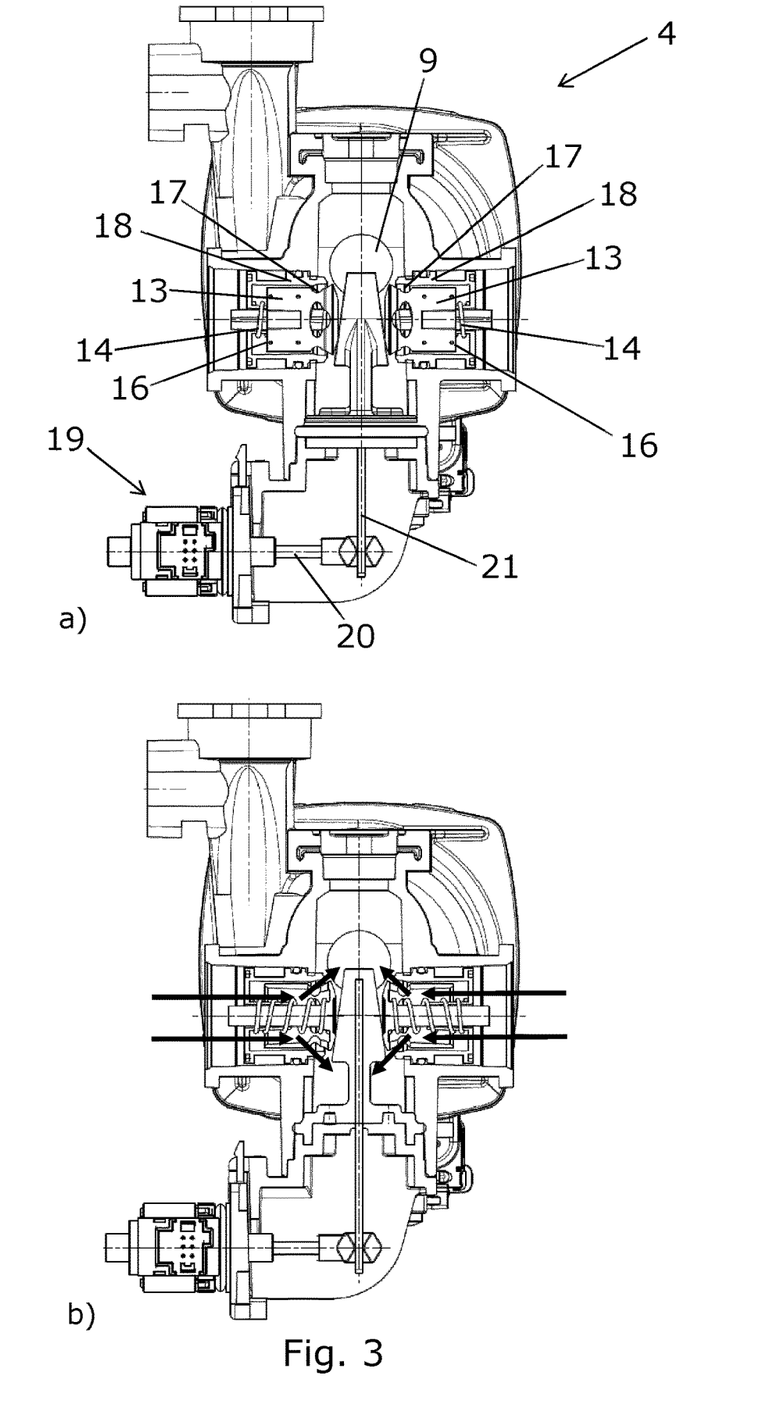

In some embodiments of the invention, each piston 13 is provided with at least one piston channel 15 (see FIG. 3.b) extending between an end 16 of the piston 13 facing towards the respective fluid supply 5,6 and a region 17 of a circumferential surface of the piston. The region 17 is covered by the inner surface 7a, 8a of the respective inlet 7,8, when the flapper valve 10 is engaged with the valve seat 11,12 of the respective inlet 7,8, and it extends beyond the inner surface 7a,8a of the respective inlet 7,8, when the flapper valve 10 is out of engagement with the valve seat 11,12 of the respective inlet 7,8. Furthermore, each piston 13 is shaped and dimensioned to provide a flow passage having a smaller flow-through area via the piston channel 15 than a cross-sectional area of the respective inlet 7,8. In addition to the flow of fluid through the piston channel, there may be flow of fluid along the outer circumference of the piston.

FIGS. 3.a and 3.b schematically show partially sectional views of an embodiment of the invention having pistons 13 in both the first and the second inlets 7,8. The embodiment is shown in exploded view in FIG. 6 where the individual elements may be more clearly seen. In this embodiment, each piston 13 is arranged in an insert 18 mounted in the respective inlet 7,8. The inserts 18 comprise the valve seats 11,12 with which the flapper valve 10 engages in the first and second positions in order to ensure a closing of the respective inlet. The inserts 18 are preferably tiltable around a longitudinal axis as described above. FIG. 3.b shows a cross-sectional view of the pistons 13 of the embodiment in FIG. 3.a to more clearly illustrate a possible design of the flow channels 15 in the pistons 13. In this embodiment, the fluid enters a piston 13 at an end 16 thereof and leaves the piston 13 through the openings 17 at the circumference; this flow path is shown with arrows in the figure. The position of the flapper valve 10 is typically controllable by use of an electric motor 19, such as a stepper motor as shown in FIGS. 3.a and 3.b. The electric motor 19 moves the flapper valve 10 via an actuator 20 connected to a lever arm 21 fixedly mounted to the flapper valve 10. In some embodiments of the invention, the position of the flapper valve 10 can be varied while the pump device 1 is in use and fluid is flowing through the mixing unit 4. Hereby it will be possible to vary the mixing ratio of the fluids from the first and second fluid sources 5,6, and thereby a selected parameter of the fluid being pumped, without having to interrupt the pumping. However, the scope of protection also covers embodiments in which it is necessary to stop the centrifugal pump 2 and thereby the flow of fluid, before the position of the flapper valve 10 is adjusted.

Figure 4:
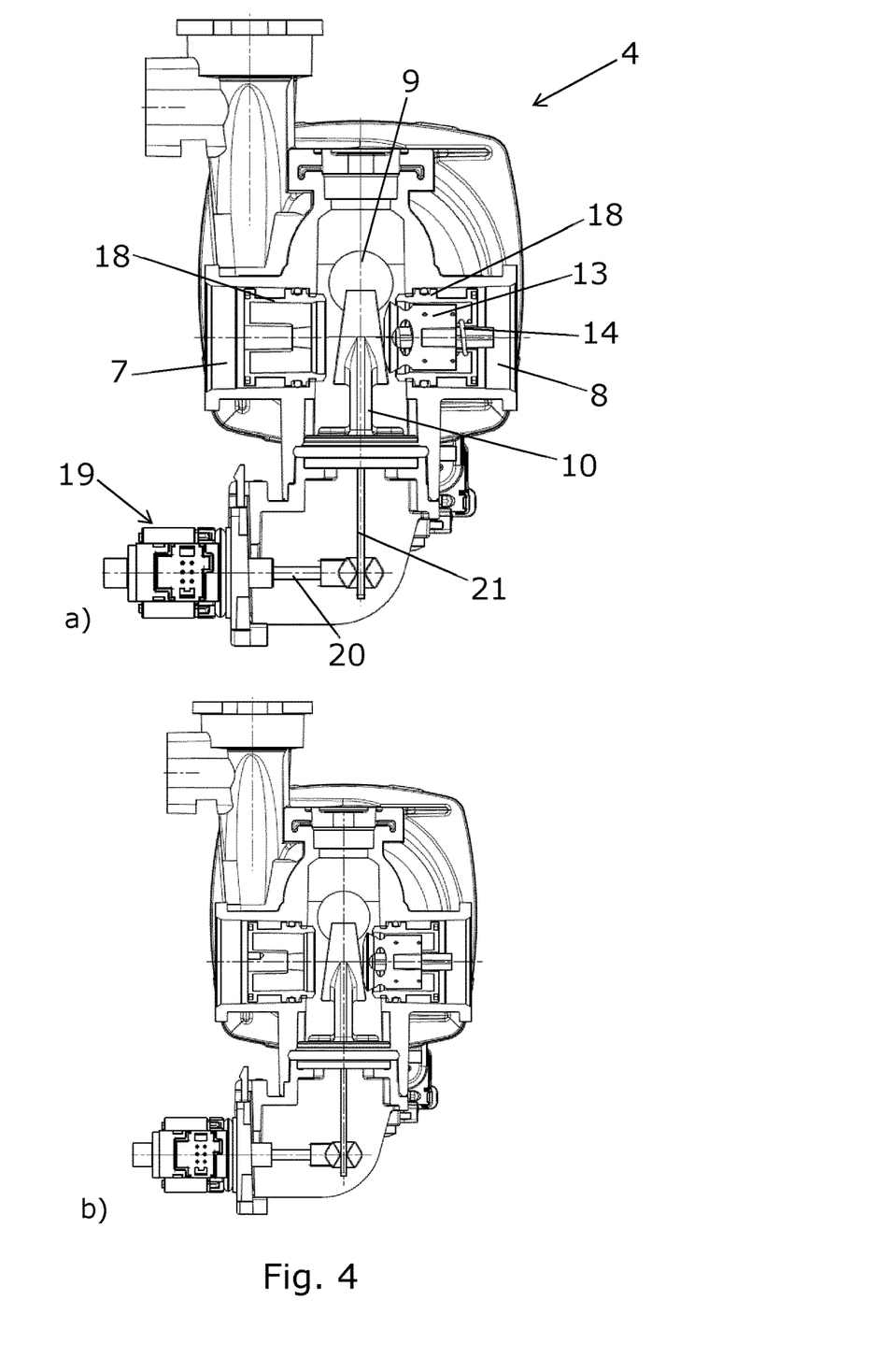

FIG. 4 shows an embodiment of the invention having inserts 18 in both the first and the second inlets 7,8, but wherein a piston 13 in arranged only in the second inlet 8. FIG. 4.a shows an embodiment with a spring 14, and FIG. 4.b shows a similar embodiment without such a spring. As explained above, the use of only one piston 13 is e.g. relevant when only one of the fluids is to be supplied in an amount which needs to be precisely controlled. For such embodiments, it may be advantageous to avoid the flow resistance otherwise caused by the fluid having to flow through a piston.

Figure 5:
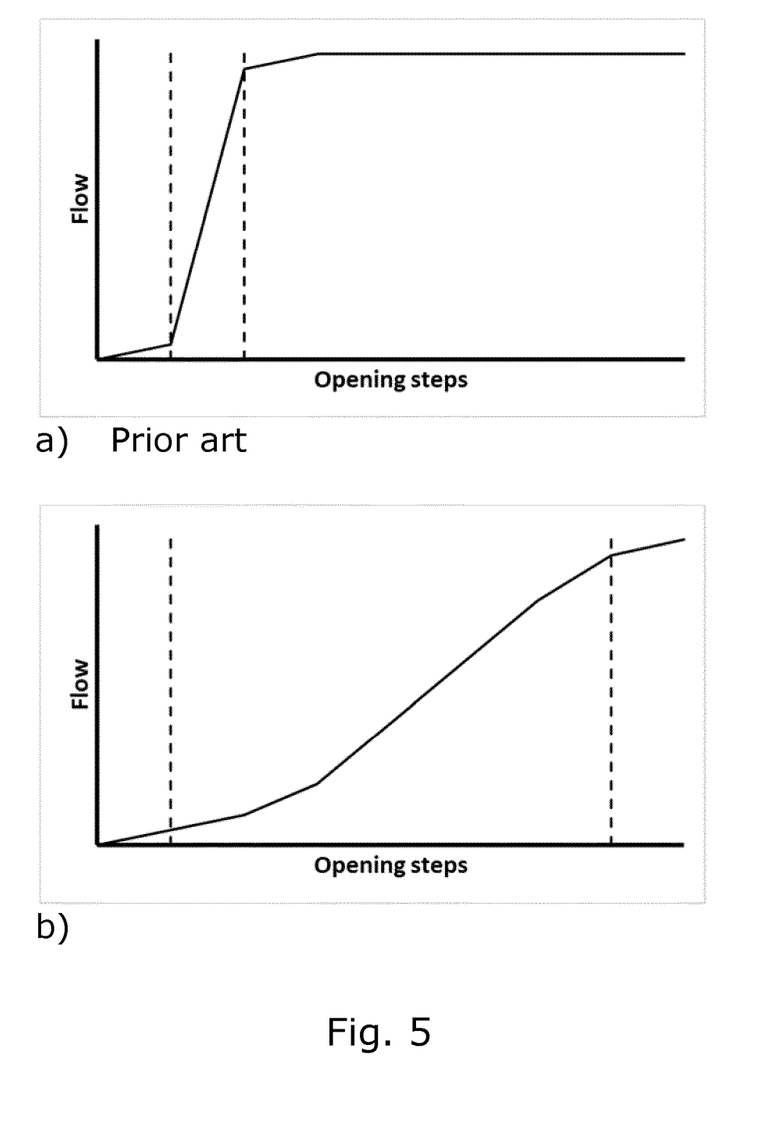

FIG. 5 illustrates how the invention provides a smoother control of the flow of fluid into each of the inlets 7,8 and thereby makes it possible to provide a more precise mixing ratio of the fluids from the first and the second fluid sources 5,6. FIG. 5.a schematically shows the flow through an inlet as a function of the opening steps for a prior art solution without pistons and without the flapper valve being controllable to be maintained in an intermediate position. This means that the flapper valve quickly moves from a position of engagement with a valve seat of an inlet and into engagement with the valve seat of the opposite inlet. For this prior art solution, when moving the flapper valve from e.g. the first to the second positions, the curve is therefore steep. FIG. 5.b shows a corresponding curve for an embodiment of the present invention in which a piston 13 as described above is inserted in the inlet 7,8. As seen from the figure, the valve characteristic shows a less steep but still rather linear curve. This means that it is easier to control the flow whereby it is easier to ensure a high precision of the corresponding mixing ratios.

Figure 6:
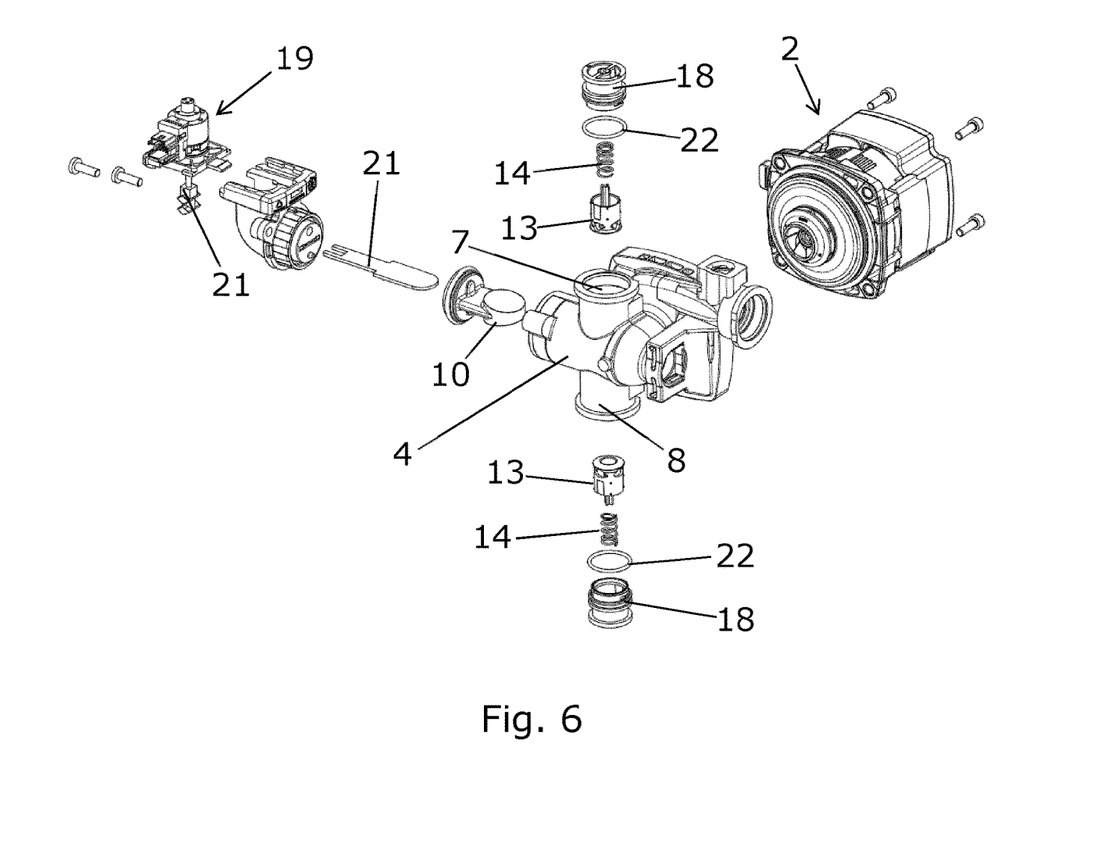
FIG. 6 schematically shows an exploded view of the pump device in FIG. 3.

FIG. 6 schematically shows an exploded view of the pump device in FIG. 3 to more clearly illustrate the designs of the different elements. This figure also shows the O-rings 22 arranged around the inserts 18 to provide a fluid-tight engagement with the inner surfaces 7a,8a of the inlets 7,8 and to allow for a small tilting of the inserts 18 as described above.

Figure 7:
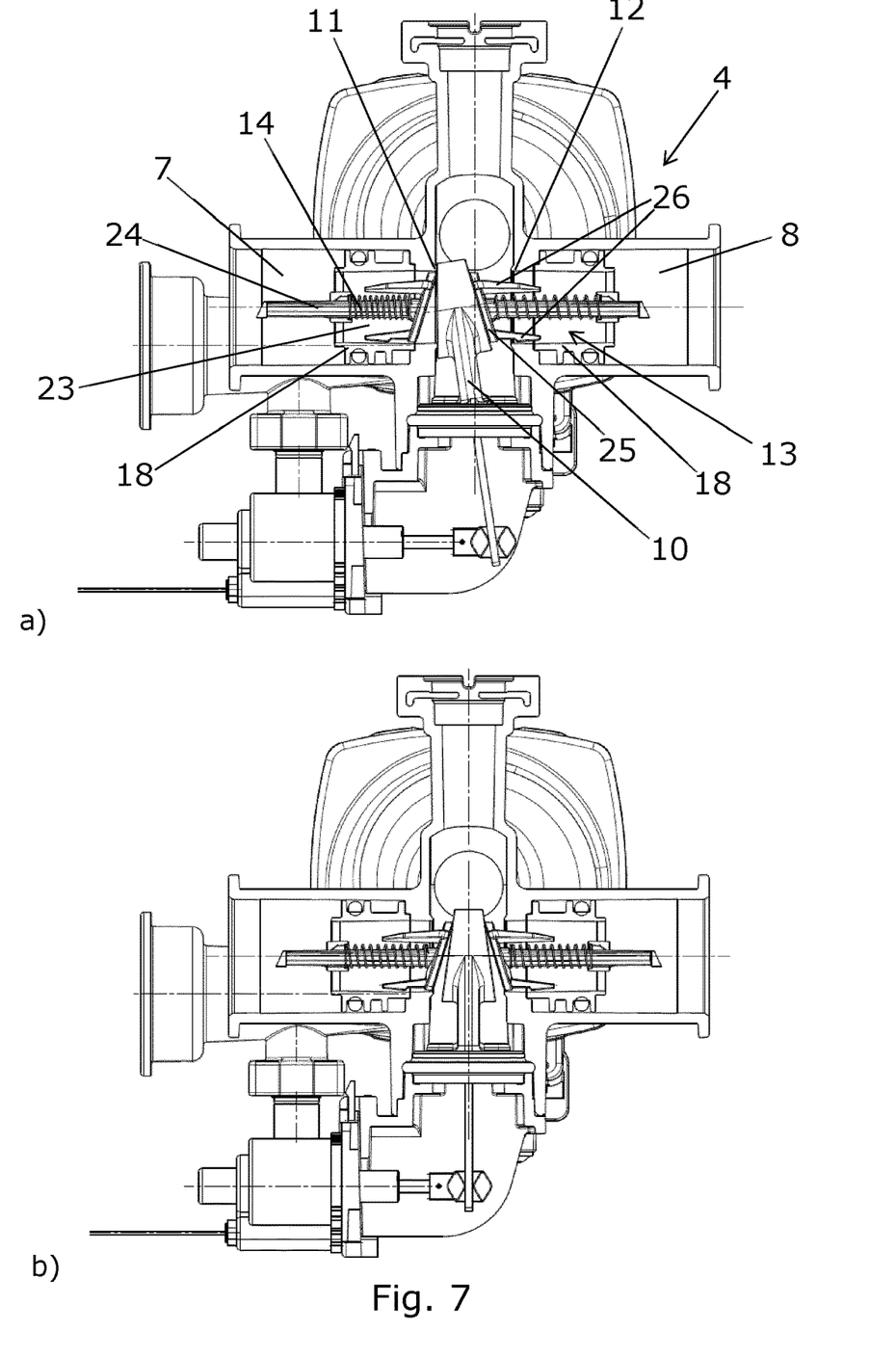

FIGS. 7.a and 7.b schematically show an embodiment of the invention comprising pistons each having and inclined piston top and an annular space for the flow of fluid. The overall functioning resembles that of the embodiments described above and will therefore not be repeated. It will be further explained in relation to FIGS. 8.a to 8.d. As for the embodiments described above, the scope of protection also covers embodiments resembling the one in FIGS. 7.a and 7.b except that there is a piston in one of the inlets only. FIG. 7.a shows the flapper valve in the first position, and FIG. 7.b shows the flapper valve in the intermediate position. In this embodiment, the first and second valve seats 11,12 are provided on the housing of the pump device 1 instead of on the inserts 18 as in FIG. 4. Each piston 13 comprises an annular space 23 and a piston rod 24 surrounded by the annular space 23. In the illustrated embodiment, the pistons 13 are biased towards the flapper valve 10 by springs 14 arranged around the piston rods 24. A disc-shaped piston top 25 is arranged on the piston rod 24 and faces towards the flapper valve 10. As shown in the figures, the piston top 25 extends in a plane which is inclined with respect to a longitudinal axis of the respective first or second inlet 7,8 housing the piston 13. Thus, when comparing this embodiment with the embodiments in the previous figures, it can be seen that the piston top 25 comprises the circumferential surface of the piston 13. Each piston further comprises guide elements 26 extending from the piston top 25 and configured to guide the movement of the piston 13 during use. In the embodiment in FIGS. 7.a and 7.b, the pump device 1 has an insert 18 arranged in each of the first and second inlets 7,8 so that in this embodiment, the guide elements 26 slide along the inner surface of the inserts 18. In the illustrated embodiment, each piston is provided with three guide elements 26. However, other numbers and other shapes of the guide elements than what is shown in the figure is also covered by the scope of protection as long as they fulfil the overall functioning of the pump device 1.

Figure 8:
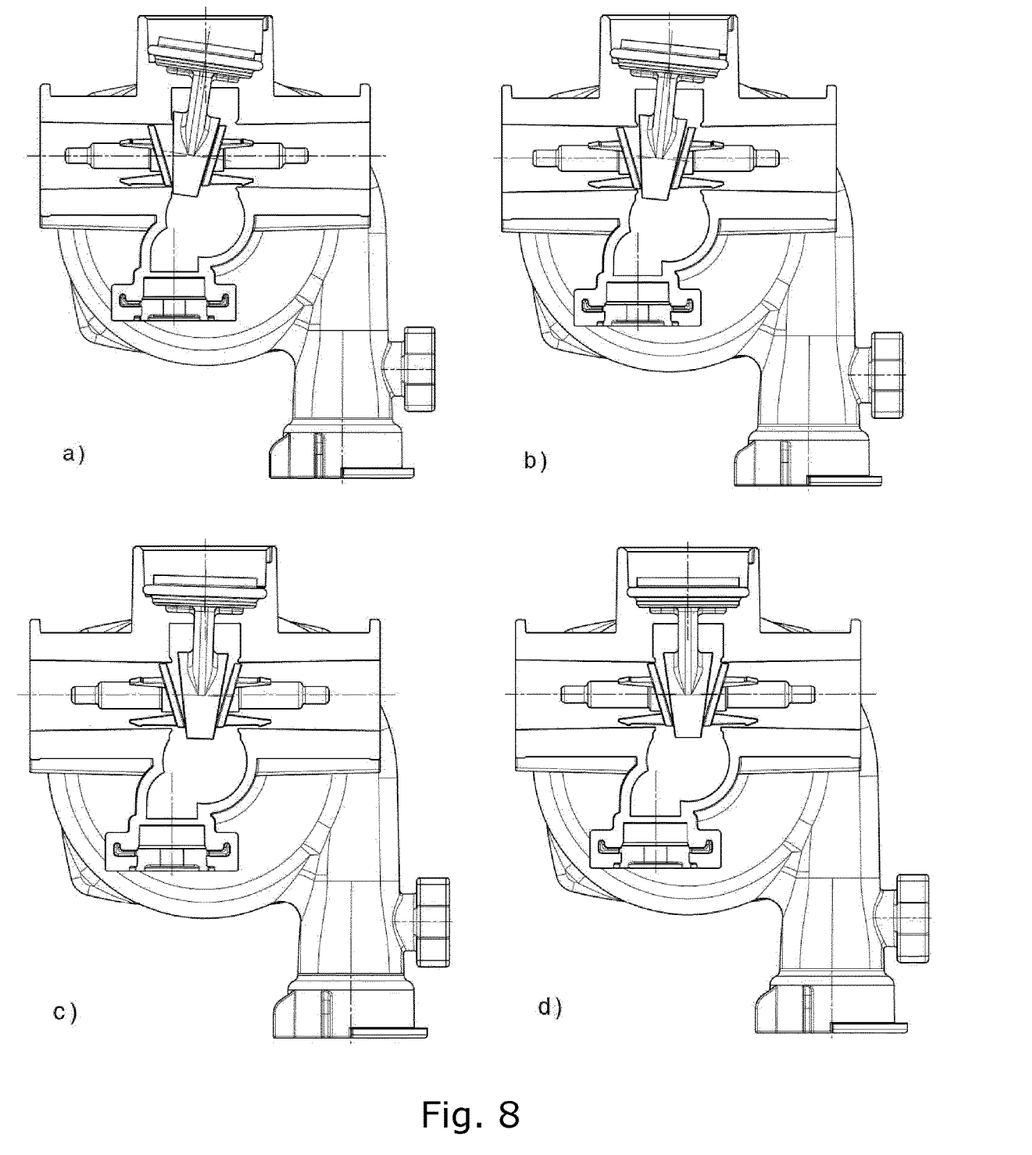

FIGS. 8.a to 8.d schematically show the functioning of the pump device in FIGS. 7.a and 7.b. In this figure, the inserts have been left out to make the figure simple so that it is easy to show the functioning. In FIG. 8.a, the flapper valve 10 is in the first position in which it is engaged with the first valve seat 11 so that there is only flow of fluid from the second inlet 8. In FIG. 8.b, the flapper valve 10 starts opening at the first valve seat 11, and there is small flow of fluid from the first inlet 7 and around the piston top 25. Due to the inclined orientation of the piston top 25, the opening of flow from the first inlet 7 is only along a small region of the circumferential surface of the piston top 25 to begin with, and then the flow increases as more and more of the circumferential surface is disengaged from the inlet. This makes it possible to provide a smooth transition and thereby a more efficient control of the flow as was illustrated in FIG. 5. In FIG. 8.c the flapper valve 10 has moved further away from the first valve seat 11 resulting in a larger flow from the first inlet 7. In FIG. 8.d, the flapper valve is in an intermediate position mid-way between the two valve seats 11,12.

Figure 9:
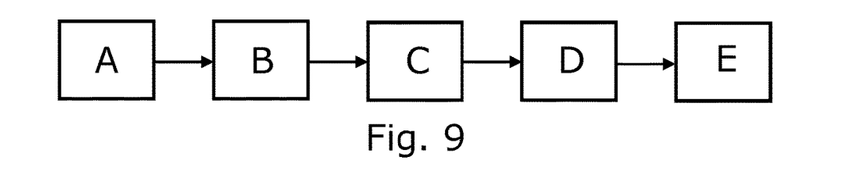
FIG. 9 is a flow diagram of a method according to the second aspect of the invention.

FIG. 9 is a flow diagram of an embodiment of a method according to the second aspect of the invention; i.e. a method of mixing fluid from a first fluid source 5 and a second fluid source 6 by use of a pump device 1 as described above. The method shown in FIG. 9 comprises the steps A to E. However, as described above, the scope of protection also covers embodiments in which the position of the flapper valve 10 is determined without the use of information about the values of the parameter of the fluid flowing from the first and second fluid sources 5,6, i.e. without steps B and C in this figure. The steps illustrated in FIG. 9 are:
A) Determining a desired value of a parameter of the fluid flowing from the outlet 9 of the mixing unit 4 and into the pump inlet 3.
B) Based on known values of the parameter of fluid flowing from the first fluid source 5 and from the second fluid source 6, determining a mixing ratio of fluid from the first and second fluid sources 5,6 which mixing ratio will result in the desired value of the parameter of the mixed fluid.
C) Determining an intermediate position of the flapper valve 10 which will provide the determined mixing ratio.
D) Positioning the flapper valve 10 in the determined intermediate position.
E) Pumping the fluid via the mixing unit 4 and into the pump inlet 3.

As described in more details above, the parameter may be temperature. In such a method, the flapper valve 10 is typically controllable, during use, in dependence of:
a desired final temperature of fluid leaving the mixing unit 4 via the outlet 9,
a known first temperature of fluid entering the mixing unit 4 via the first inlet 7, and
a known second temperature of fluid entering the mixing unit 4 via the second inlet 8.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Furthermore, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:
1. Pump device comprising:
a centrifugal pump having a pump inlet for receiving a fluid to be pumped, and
a mixing unit mounted to or integrated with the centrifugal pump,
wherein the mixing unit comprises:
a first inlet configured to be connected to a first fluid supply,
a second inlet configured to be connected to a second fluid supply,
an outlet in fluid communication with the pump inlet, and
a flapper valve configured to perform a pivoting movement between:
a first position in which it is engaged with a first valve seat of the first inlet so that the flapper valve closes the first inlet while providing fluid communication between the second inlet and the outlet, and a second position in which it is engaged with a second valve seat of the second inlet so that the flapper valve closes the second inlet while providing fluid communication between the first inlet and the outlet, wherein at least one of the first inlet and the second inlet houses a piston being:
- configured to move along an inner surface of the respective inlet,
- biased towards being in contact with the flapper valve during use,
- provided with at least one piston channel or annular space extending between:
  - an end of the piston facing towards the respective fluid supply, and
  - a region of a circumferential surface of the piston, which region:
    - is covered by the inner surface of the respective inlet, when the flapper valve is engaged with the valve seat of the respective inlet,
    - extends beyond the inner surface of the respective inlet, when the flapper valve is out of engagement with the valve seat of the respective inlet, and
  - shaped and dimensioned to provide a flow passage having a smaller flow-through area via the piston channel or the annular space than a cross-sectional area of the respective inlet, and wherein the position of the flapper valve is controllable, and the flapper valve is configured to maintain intermediate positions between the first position and the second position thereby providing corresponding mixing ratios of fluids flowing into the centrifugal pump via the first inlet and the second inlet during use of the pump device.

2. Pump device according to claim 1, wherein each piston comprises the annular space and further comprises:
- a piston rod surrounded by the annular space,
- a disc-shaped piston top comprising the circumferential surface of the piston, wherein the piston top is:
  - arranged on the piston rod,
  - facing towards the flapper valve, and
  - extending in a plane which is inclined with respect to a longitudinal axis of the respective first or second inlet housing the piston, and
- at least one guide element extending from the piston top and configured to guide the movement of the piston along the inner surface of the respective inlet during use.

3. Pump device according to claim 1, wherein each piston is spring-loaded so that it is thereby biased towards being in contact with the flapper valve.

4. Pump device according to claim 1, wherein the mixing unit comprises a piston in each of the first inlet and the second inlet.

5. Pump device according to claim 1, wherein each piston is arranged in an insert mounted in the respective inlet, and optionally wherein the insert comprises the valve seat of the respective inlet.

6. Pump device to claim 5, wherein the insert is tiltable around a longitudinal axis.

7. Pump device according to claim 6, wherein the insert is tiltable by ±3 degrees.

8. Pump device according to claim 7, wherein the insert is tiltable by ±2 degrees.

9. Pump device according to claim 8, wherein the insert is tiltable by ±1.5 degrees.

10. Pump device according to claim 9, wherein the insert is tiltable by ±1 degree.

11. Pump device according to claim 1, wherein the position of the flapper valve is controllable by use of an electric motor.

12. Pump device according to claim 11, wherein the position of the flapper valve is controllable by use of a stepper motor.

13. Pump device according to claim 1, wherein the position of the flapper valve is controllable, during use, in dependence of:
- a desired final temperature of fluid leaving the mixing unit via the outlet.

14. Pump device according to claim 1, wherein the position of the flapper valve is further controllable, during use, in dependence of:
- a known first temperature of fluid entering the mixing unit via the first inlet, and/or
- a known second temperature of fluid entering the mixing unit via the second inlet.

15. Pump device according to claim 1, wherein the position of the flapper valve can be varied while the pump device is in use and fluid is flowing through the mixing valve.

16. Pump device according to claim 1, wherein the flapper valve is made from a rubber material.

17. Pump device according to claim 1, wherein the at least one piston and/or the at least one insert, when present, has/have been manufactured by 3D-printing.

18. Method of mixing fluid from a first fluid source and a second fluid source by use of a pump device according to claim 1, the method comprising the following steps:
- determining a desired value of a parameter of the fluid flowing from the outlet of the mixing unit and into the pump inlet,
- determining an intermediate position of the flapper valve which will provide the desired value of the parameter of the mixed fluid,
- positioning the flapper valve in the determined intermediate position, and
- pumping the fluid via the mixing unit and into the pump inlet.

19. Method according to claim 18, further comprising the following steps:
- based on known values of the parameter of fluid flowing from the first fluid source and from the second fluid source, determining a mixing ratio of fluid from the first and second fluid sources which mixing ratio will result in the desired value of the parameter of the mixed fluid,
- determining the intermediate position of the flapper valve which will provide the determined mixing ratio.

20. Method according to claim 18, wherein the parameter is temperature.

* * * * *